United States Patent [19]

Munkner et al.

[11] Patent Number: 5,209,340

[45] Date of Patent: May 11, 1993

[54] METHOD AND DEVICE FOR DISPLAYING ADVERTISEMENTS ON CONVEYORS

[75] Inventors: Jurgen R. Munkner; Heinz-Joachim E. Schroeder, both of Valencia, Spain

[73] Assignee: IAP (International Airport Promotion) N.V., Curacao, Netherlands

[21] Appl. No.: 828,191

[22] Filed: Jan. 30, 1992

Related U.S. Application Data

[63] Continuation of Ser. No. 505,271, Apr. 6, 1990, abandoned.

[30] Foreign Application Priority Data

Jun. 2, 1989 [ES] Spain ................................. 8901789
Dec. 29, 1989 [EP] European Pat. Off. ........ 89560004.7

[51] Int. Cl.[5] .............................................. B65G 43/00
[52] U.S. Cl. .................................. 198/502.1; 198/577; 198/852; 40/472; 40/524
[58] Field of Search ............... 198/502.1, 577, 579, 198/803.16, 822, 852, 853; 40/472, 476, 524, 526

[56] References Cited

U.S. PATENT DOCUMENTS

| | | | |
|---|---|---|---|
| 1,424,850 | 8/1922 | Purcell | 198/852 |
| 1,812,715 | 6/1931 | Quillin et al. | 40/472 |
| 1,817,373 | 8/1931 | Hopkins | 198/852 X |
| 3,612,244 | 10/1971 | Raub, Sr. et al. | 198/579 |
| 3,849,918 | 11/1974 | Mazzocco, Sr. | 40/472 |
| 3,895,691 | 7/1975 | Shiraishi | 198/852 X |
| 3,982,625 | 9/1976 | Wentz et al. | 198/577 X |
| 4,979,591 | 12/1990 | Habegger et al. | 198/502.1 X |
| 5,165,526 | 11/1992 | Conklin, Jr. | 198/804 |

Primary Examiner—Joseph E. Valenza
Assistant Examiner—Tuan N. Nguyen
Attorney, Agent, or Firm—Beveridge, DeGrandi, Weilacher & Young

[57] ABSTRACT

A method and apparatus for displaying advertisements on conveyors that includes posters which are made out of suitable materials, are shaped and printed with the desired advertisement, are set in place by adhesion to the belt-plates forming the conveyor belt, and then are specially cut and perforated as required, so that the posters: a) properly carry advertising messages on conveyors; b) conform to any shape of conveyors; c) stay smoothly adhered to any top surface of the belt-plates; d) endure damage from objects transported by the belts; e) are precisely cut, when applicable, along the contours of adjacent belt-plates to allow free rotation on curved tracks; f) have small strategic holes, when applicable, to allow free maintenance access to fasteners in the belt-plates; and g) are easily installed, displayed, replaced and removed without ever interfering with the operation and maintenance of conveyors. The device creates a new powerful advertising medium in any airport baggage conveyor as the focus of a large mass of selected public.

12 Claims, 2 Drawing Sheets

METHOD AND DEVICE FOR DISPLAYING ADVERTISEMENTS ON CONVEYORS

This is a continuation of co-pending application Ser. No. 07/505,271 filed on Apr. 6, 1990, now abandoned.

FIELD OF THE INVENTION

The present invention is directed at a method and apparatus for displaying advertisements on conveyors such as a baggage conveyor.

SUMMARY

The protection requested in this patent application must be understood to encompass the essence of the following description. Although a best effort is made to explicitly describe the cases, forms and variations to which the basic invention can be applied, it is unavoidable to narrow down its description to a few practical examples in order to make it intelligible. Therefore, the descriptions, drawings, explanations, and examples contained herein are to be taken only as a means to convey the essence of the basic invention, and any modifications derived therefrom must be included in the requested protection.

In its most general terms, an object of the present patent application can be described as the providing of properly prepared posters displaying advertising messages which are set in place over the belt-plates forming the belt of a conveyor. It is particularly applicable for use with any baggage conveyor used at airports.

Precedents on inventions and patents for publicity devices and advertising media, as well as their great importance in the modern world, are common knowledge. The value of these devices and media increases with their capability to attract attention to selected audiences.

This device creates a new and unexploited advertising medium with a unique character. It is strategically located at the meeting point of a mass of air travellers with expending means, avid of local information, and captive around the conveyor while waiting for the baggage arrivals. Further, it is entertaining, both in the form presented and in its imaginative possibilities, transforming an ordinary conveyor into a lively focus of attention.

The advertising posters are the main focal point of this device. They are made out of thin but strong materials, such as sheets of polyethylene or similar synthetics. They are sized and shaped according to the desired advertising messages or designs, within the area limits provided by the belt of a particular conveyor. The advertising messages or publicity designs displayed by the posters are printed in indelible, scratch-free printing inks. The posters are set in place, wrinkle-free, by means of pressure-sensitive adhesives or similar adhesive emulsions. Thus, each poster includes a contacting surface which is fixed with respect to the contacting surface of the underlying conveyor plate or plates such that the contacting surface of the plates and poster are essentially co-planar. Then, by means of a cutting process, the posters are adapted to each type of conveyor, as described below. When required, the posters also have small access perforations aligned with maintenance fasteners sometimes located on the belt-plates underneath.

In its overall conception, the materials, sizes and shapes, printing, adhesion, settings, cutting process, and perforations, are all selected and designed to assure that the posters: (a) properly meet their advertising displaying objective on a conveyor type; (b) set and stay firmly in place, yet are easily removed and replaced; (c) never interfere with the operation and maintenance of conveyors; and (d) endure the wearing and tearing of baggages and other objects transported on conveyors.

BRIEF DESCRIPTION OF THE DRAWINGS

In the following lines it is described the specific adaptation to any type of conveyor under any possible condition. In order to assist the description, two pages of drawings containing seven figures are attached to this application and made part thereof, as examples of the essence of the invention.

DETAILED DESCRIPTION OF THE PREFERRED EMBODIMENTS

Case (A): Elongated conveyors with non-overlapping belt-plates on which posters are set in place over several belt-plates. By being elongated (as opposed to circular), these conveyors have straight tracks and curved tracks.

Figure 1:
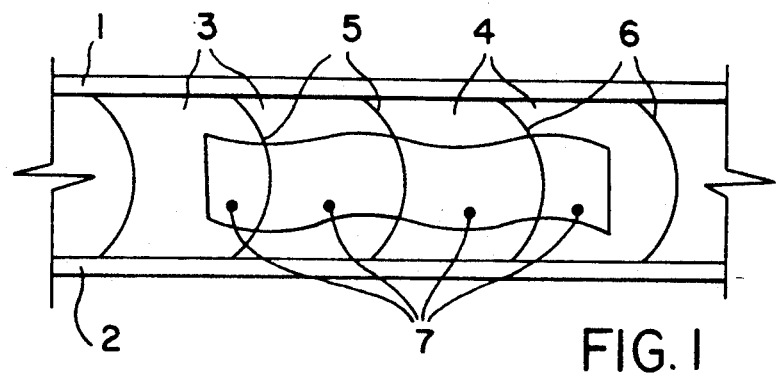
FIG. 1 illustrates a planar, partially broken away view of a first embodiment of the invention travelling along a straight section of a conveyor.

FIG. 1 represents a partial view of a straight track, showing: The rails (1, 2) between which the belt-plates (3, 4) run in their transport motion; the contours (5, 6—arched in this example) of the belt-plates; and one advertising poster (7) set in pace over several belt-plates (3, 4,). During the transport motion through straight tracks, all belt-plates keep the same relative position to each other. As a result, all posters (7) are fully readable and composed as originally intended through the straight tracks.

Figure 2:
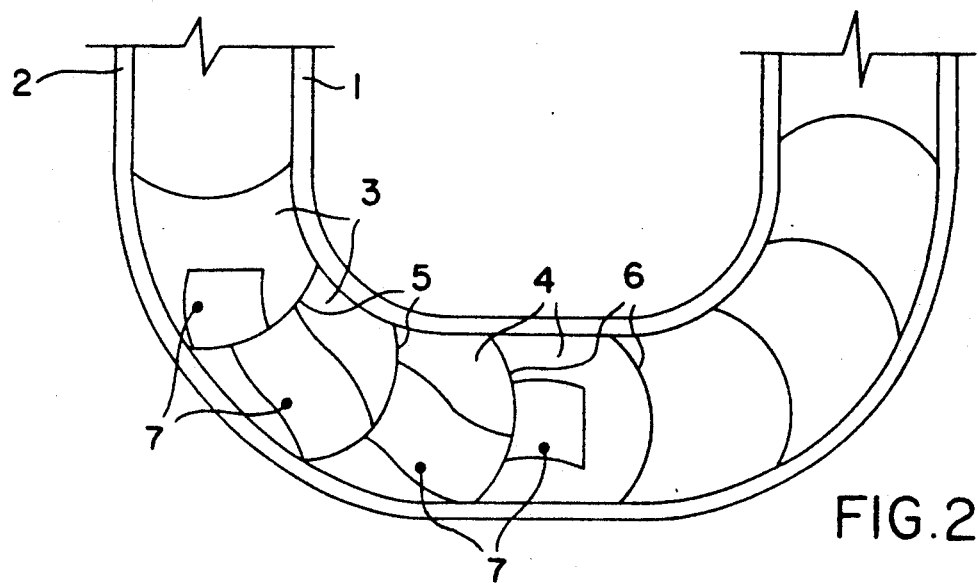
FIG. 2 illustrates a planar view of the embodiment of FIG. 1 travelling about a curved section of the conveyor.

FIG. 2 represents a view of a curved track of the same elongated conveyor represented in FIG. 1, showing: The rails (1, 2); the same belt-plates (3, 4 turning through a curved track; their contours (5, 6); and the same poster (7). During the transport motion through curved tracks, each belt-plate rotates on itself, changing the relative position to each other.

Figure 3:
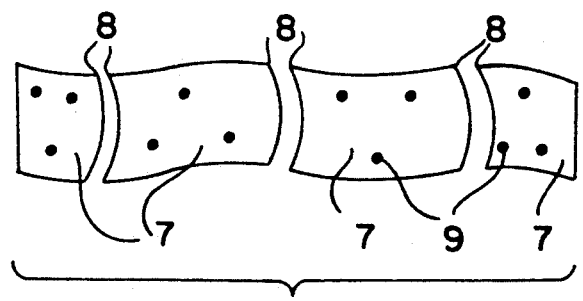
FIG. 3 shows a planar view of the poster segments of the first embodiment shown in FIG. 1.

For this reason, each poster (7) set in place over several belt-plates (3, 4) is cut along each belt-plate contour (5, 6) in order to allow for the free rotation play of the belt-plates in their transport motion through curved tracks. This cutting process eaves each poster unit divided in a number of portions (four in this example) which correspond to the same number of belt-plates underneath, as shown in FIG. 3. Since there is a small but definite gap between each adjacent belt-plate, two cuts per gap are made (8) and the poster material between cuts is then removed to prevent any interference with the free rotation play of each belt-plate.

Thus, after the cutting process described above, each portion of the poster set in place over its corresponding belt-plate also rotates on itself, changing the relative position to each other, as shown in FIG. 2.

As a result, all poster units (7) which were fully readable and composed as originally intended through straight tracks, now breakdown as puzzles through curved tracks (as shown in FIG. 2), only to recompose themselves and become fully readable again through the next straight track (as shown in FIG. 1).

This puzzle effect can also be accomplished, of course, in reverse. In this case, the posters are set in place at curved tracks as fully readable and composed units to which the cutting process is applied, and then these poster units breakdown as puzzles through straight tracks. The puzzle effect occurs in all elongated conveyors.

FIG. 3 represents a poster unit, as mentioned above. It also shows the small perforations (9) sometimes required to provide access to maintenance fasteners on the belt-plates underneath.

As described and shown above, the device, by means of the cutting process, fully meets its advertising displaying objective both through the conveyor's straight and curved tracks. The adaptations to any other type of conveyor are simple modifications or variations, which are part of this patent application, to the basic device as described for case (A).

Case (B): Elongated conveyors with non-overlapping belt-plates on which each poster is set in place over a singe belt-plate. This case is identical to case (A) except that each poster is confined to a single belt-plate.

Thus, in this case, posters are simply set in place without applying any cutting process, since they never interfere with the free rotation play of any belt-plate in its transport motion through curved tracks.

Case (C): Elongated conveyors with overlapping belt-plates on which posters are set in place over either one or several belt-plates.

The belt-plates in these conveyors partially overlap each other on their transport motion through curved tracks. The overlapping area is always equal and well defined on all belt-plates, and only covers up to a maximum of one-half of their total area, leaving at least another one-half area never overlapped on each belt-plate.

Thus, in this case, posters are designed to display advertisement only on the corresponding areas of the belt-plates which never overlap. They are set in place, and then their blank, unprinted portions are cutoff and removed to prevent any interference with the overlapping action.

Figure 4:
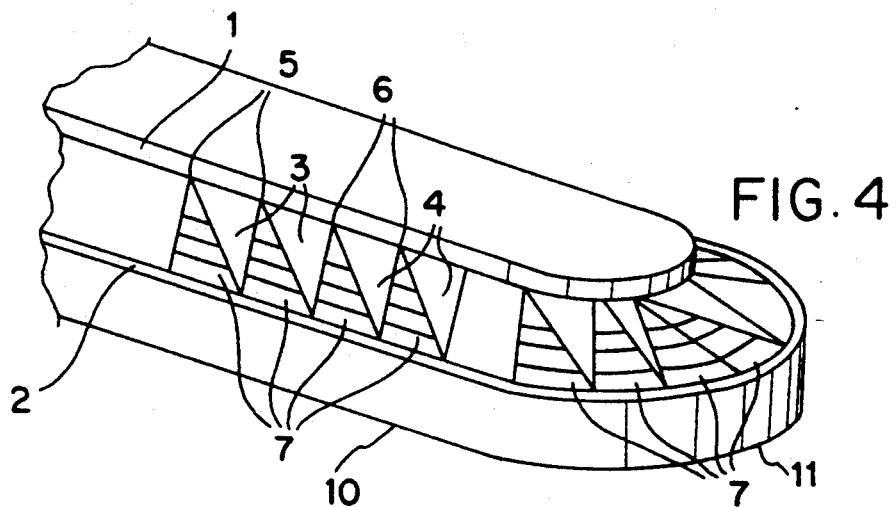
FIG. 4 shows a perspective view of a second embodiment of the invention.

FIG. 4 represents a partial view of a typical elongated conveyor with overlapping belt-plates, showing: The rails (1, 2); the straight track (10); the curved track (11); the belt-plates (3, 4—rectangular in this example; the belt-plate contours (5, 6—straight in this example); the overlapping areas on the belt-plates (3, 4); and two posters (7) with their blank portions removed, as they run through straight and curved tracks.

Figure 5:
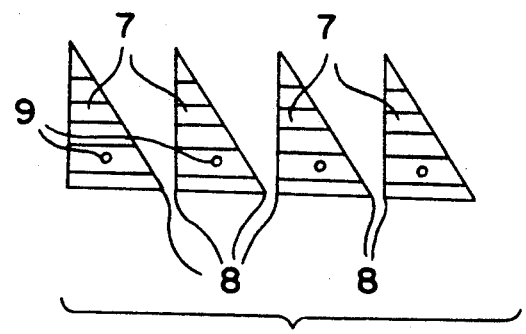
FIG. 5 shows the poster segments of the embodiment shown in FIG. 4.

FIG. 5 represents an example of a poster unit adapted to the elongated conveyor with overlapping belt-plates represented in FIG. 4, showing: The printed areas (7); the gaps (8); and the maintenance access perforations (9).

Case (D): Any circular conveyor on which posters are set in place over either one or several belt-plates. By being circular the belt-plates in these conveyors always keep the same relative position to each other, never overlapping in their transport motion through the circular track.

Thus, in this case, posters are simply set in place without applying any cutting process.

Figure 6:
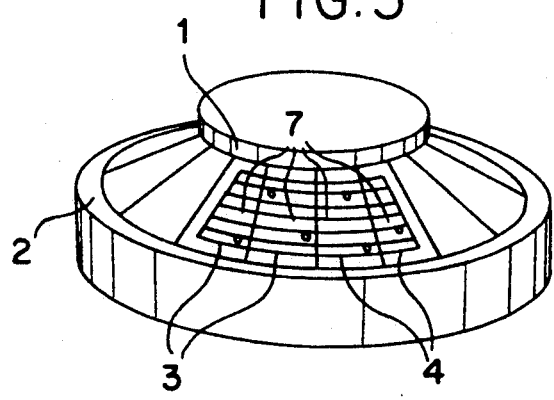
FIG. 6 shows a perspective view of a third embodiment of the present invention.

FIG. 6 represents a view of a typical circular conveyor, showing: The rails 1, 2); the belt-plates (3, 4); and a poster (7).

Figure 7:
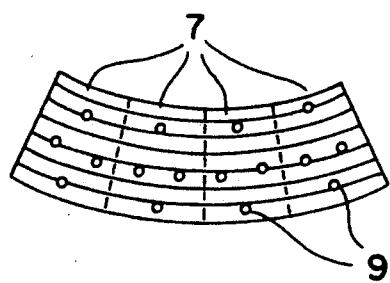
FIG. 7 shows the poster used in the third embodiment shown in FIG. 6.

FIG. 7 represents an example of a poster (7) adapted to the circular conveyor represented in FIG. 6, showing: Its possible truncated-cone shape to optimally conform the shape of this circular conveyor; the absence of any cuts or gaps, and the maintenance access perforations (9).

After completing above the description of the present invention, the points of protection are expressed in the following.

What is claimed is:

1. A method of displaying advertisement on an item supporting conveyor track having a horizontally curved section, a straight section, and a plurality of non-overlapping, substantially horizontal, individually rotatable item supporting belt-plates which feature adjacent curved contour sections, comprising:

securing an advertising poster comprised of a plurality of poster segments onto a plurality of adjacent belt-plates such that each poster segment is supported by a respective one of said adjacent belt-plates and such that said plurality of poster segments each have at least one peripheral portion which corresponds to the curved contour section of an underlying belt-plate and such that said poster segments individually rotate with respect to each other as the individually rotatable belt-plates rotate;

arranging said poster segments so that said poster segments combine together to convey a message during either said horizontally curved section or said straight section and become disoriented in an essentially non-message conveying arrangement during the other of said horizontally curved section or said straight section of the conveyor track while maintaining each of said poster segments in an essentially co-planar relationship with respect to said belt-plates and with each other both when combining together and when becoming disoriented.

2. A method of displaying advertisement as recited in claim 1, wherein said step of arranging said advertising segments includes arranging said segments such that said section of the conveyor track where a message is conveyed is the straight section.

3. A method of displaying advertisement as recited in claim 1, further comprising the step of cutting said advertisement poster while affixed to the conveyor track to form said plurality of advertisement segments.

4. A method as recited in claim 1 wherein securing said poster segments on said adjacent belt-plates includes positioning each poster segment so as to present an upper planar advertisement surface which comes in contact with items being conveyed by said conveyor and such that the upper planar surface of each poster segment is visible during travel along said curved and straight sections unless covered, or partially covered by items being conveyed along said conveyor track.

5. A device for the displaying of advertisements on an item supporting conveyor having a horizontally curved section, a straight section, and non-overlapping, substantially horizontal, individually rotatable belt-plates which have adjacent curved contour sections and which pass along the curved and straight sections and which together form an item covering conveyor track, comprising:

a poster carrying a message;

means for securing said poster to a group off adjacent item supporting belt-plates;

said poster being dimensioned and arranged so as to pass freely and without interfering with conveyor performance through the curved section of the conveyor track, and said poster includes a plurality of poster segments secured to respective ones of a plurality of the adjacent belt-plates, and said poster segments being dimensioned and arranged so as to move individually together with the underlying belt-plates to convey the message during either said horizontally curved section or said straight section of the conveyor track and to individually reorientate together with the underlying belt-plates in an essentially non-message conveying fashion during the other of said horizontally curved section or said straight section of the conveyor track; and wherein the poster segments of said poster have adjacent curved edges of the same curvature so as not to interfere with one another during travel along the conveyor track, and wherein the curvature of said poster segments conforms with the curved contour section of an individually rotatable underlying belt-plate such that said poster segments individually rotate with respect to each other as the individually rotatable belt-plates rotate and wherein said poster segments maintain an essentially co-planar relationship with respect to the underlying belt-plates and with respect to each other while said poster segments individually rotate together with the underlying belt-plates during travel through both said curved and straight sections.

6. A device as recited in claim 5, wherein said means for securing includes a pressure sensitive adhesive.

7. A device as recited in claim 5, wherein said poster segments are positioned with adjacent edges being spaced from one another and having the same curvature and wherein at least one poster segment extends between a first peripheral curved edge positioned upstream with respect to conveyor track movement and a second peripheral curved edge of an underlying belt-plate positioned downstream.

8. A device is recited in claim 5, wherein said poster is provided with perforations which align with maintenance fasteners located in underlying belt-plates underneath.

9. A device as recited in claim 5, wherein said poster segments include messages printed thereon with indelible scratch free inks.

10. A device as recited in claim 5, wherein said poster segments include a contacting surface which is in contact with a contacting surface of an underlying belt-plate and wherein said poster segments are dimensioned and arranged such that during travel along said curved section and said straight section, said poster segments are visible unless covered or partially covered by an item being conveyed by said item supporting conveyor.

11. A device as recited in claim 5, wherein said poster segments are dimensioned and arranged so as to combine together during the passage of the poster segments through the straight section of the conveyor conveyor.

12. A device as recited in claim 5 wherein each of said poster segments includes a planar, upper advertisement surface which comes in contact with items being conveyed by said conveyor and said poster segments being positioned so as to be visible during travel along said curved and straight conveyor track sections unless covered or partially covered by items being conveyed along said conveyor track.

* * * * *